Figure 1:
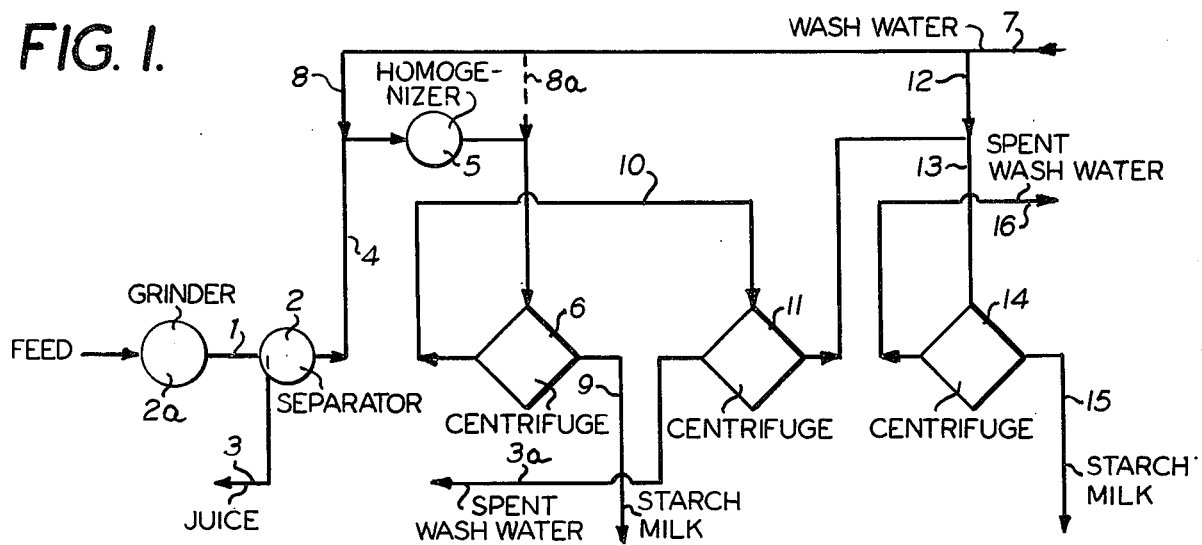

United States Patent
Huster et al.

[11] 3,948,677
[45] Apr. 6, 1976

[54] PROCESS FOR THE RECOVERY OF STARCH FROM THE CELLULAR TISSUE OF ROOT CROPS

[75] Inventors: Heinrich Huster; Franz Heimeier, both of Oelde, Germany

[73] Assignee: Westfalia Separator AG, Oelde Westphalia, Germany

[22] Filed: May 3, 1974

[21] Appl. No.: 466,949

[30] Foreign Application Priority Data
May 9, 1973 Germany.......................... 2323248

[52] U.S. Cl. .................. 127/66; 99/511; 99/536; 127/67; 241/20; 241/29
[51] Int. Cl.² .......................................... C13L 1/02
[58] Field of Search .......... 127/66, 67; 99/511, 512, 99/513, 516, 536; 241/20, 29

[56] References Cited
UNITED STATES PATENTS

| | | | |
|---|---|---|---|
| 2,084,250 | 6/1937 | Fritze | 127/66 |
| 2,149,802 | 3/1939 | Thurber | 127/66 |
| 2,304,929 | 12/1942 | Keith | 99/512 |
| 2,443,897 | 6/1948 | Dexter | 127/66 |
| 3,072,501 | 1/1963 | Meisel | 127/67 |
| 3,079,283 | 2/1963 | Dreissen | 127/67 |
| 3,446,665 | 5/1969 | Castiello | 127/67 |
| 3,813,297 | 5/1974 | Shaw, Jr. | 127/66 |
| 3,890,888 | 6/1975 | Verberne | 99/516 X |

Primary Examiner—Joseph Scovronek
Assistant Examiner—Sidney Marantz
Attorney, Agent, or Firm—Burgess, Dinklage & Sprung

[57] ABSTRACT

In the recovery of starch from cell tissue of root crop such as potatoes, by centrifuging, the feed to one of the centrifuging steps, in which an aqueous phase containing fibers and protein is separated from starch milk, is subjected to homogenization to free the fibers of included starch. Thereby, better separation in the centrifuging step is obtained.

5 Claims, 3 Drawing Figures

PROCESS FOR THE RECOVERY OF STARCH FROM THE CELLULAR TISSUE OF ROOT CROPS

BACKGROUND

The invention relates to a process for the recovery of starch from the cellular tissue of root crops such as potatoes, in which the starting material is first washed and then ground, the pulp thus obtained is freed of most of the juice by means of a centrifuge in a preliminary stage, and the remaining mixture consisting essentially of starch and vegetable cell tissue is separated, after the addition of wash water, into starch milk and an aqueous phase carrying the fibrous substances. This washing out of the fibrous substances takes place in a plurality of successive stages.

For decades sieves have been used for this separating and washing process. Centrifuges have not been commonly used hitherto for this process because, depending on the throughput of a centrifuge drum, either too much fibrous substance and coagulated protein get into the starch or too much starch is lost with the fibrous substance. A reason for this is that a larger particle of a specifically lighter substance may have the same settling speed as a smaller particle of a specifically heavier substance. Separation of such particles is impossible by means of a centrifuge. A second reason is that the solid particles of different density--the fibers and the starch--are not present entirely in the form of individual components that are free of one another. The tissue particles, which are produced in the grinding and have been subjected to a preliminary juice removal, to some extent still contain starch grains within them, so that they have a greater specific weight than the pure fiber material. The difference in density is so slight that the separation of the weighted fibers from the starch in a centrifugal separator is very difficult.

It is known that the settling speed of a suspended particle is linearly proportional to the difference in density between the solid and the liquid vehicle, and is proportional to the square of the particle diameter. The fact that it is also dependent upon the distance of the particle from the axis of rotation and upon the angular velocity of the drum and the viscosity of the liquid vehicle can here be disregarded. In the framework of the present invention only the difference in density and the particle size are important.

From the settling speed and the distance the particle must travel in settling, which depends on the design of the drum, one can know the time which a particle of a certain size in a given suspension takes to cover this distance. From this time, taken as the minimum time of stay of the particle in the drum, and the capacity of the drum, it is possible to calculate the maximum throughput.

If a fluid contains only particles of the same solid, but having a wide range of diameters, then at a certain throughput the coarser particles are separated out, down to the size which has sufficient time to cover the settling distance. The finer particles are entrained by the vehicle fluid and emerge from the drum together with the latter. If, for example, it was desired also to separate solid particles having a diameter that is smaller by one power of ten, it would be necessary, on account of the quadratic relationship between the settling speed and the particle diameter, to increase the time of stay of the mixture in the drum by a factor of 100, i.e., to reduce the throughput to 1%. Thus it is possible by varying the throughput to influence the degree of separation.

If a liquid contains two kinds of solid of different density but the same particle size distribution, the largest particles of the specifically heavier component will settle the most rapidly and can be obtained in pure form. However, the smaller particles of the specifically heavier component correspond to larger particles of the specifically lighter component which have the same settling speed and therefore such particles cannot be separated from one another in a centrifugal separator. Depending on the throughput of the separator, this mixed portion may be taken out of the drum together with the coarser, specifically heavier solids, or together with the liquid vehicle. It may also be divided between the two discharges in any desired ratio.

With regard to the recovery of starch from the cell tissue of root crops it must be mentioned that the fibers and the starch grains suspended in the water do not have the same size distribution. Therefore in the centrifugal separation of the pulp coming from the preliminary stage, to which washing water has been added, the disadvantages described above occur, i.e. either too many fibers and coagulated protein get into the starch or too much starch is lost with the fibers.

On account of this apparently insolvable problem the use of sieves in the wash-out part of the starch recovery system has been continued. Sieves, of course, divide according to particle size alone, regardless of the density, the maximum grain size being determined by the mesh size. The mesh size of the first sieve is such that the largest starch grains are able to pass through and the coarser fibers are held back. Finer fibers and coagulated protein pass through the mesh openings and have to be separated from the starch by centrifugation. To the extent that the fibers passing through the mesh openings still contain starch, such separation becomes very difficult, for the reasons stated above.

In any case, starch is still contained in the coarse fibers held back by the first sieve. They are therefore subjected to a regrinding in a second grinder and they are washed with the addition of water on at least one additional sieve. No further grinding is performed.

Fine fibers and coagulated protein also get into the starch from the second sieve, and from the third if any, while on the other hand the coarser fibers retained by the last sieve may still contain starch, thereby reducing the yield.

Sieves also have the disadvantage that the meshes of the sieve gradually become clogged with coagulated protein, requiring frequent cleaning.

To forestall this disadvantage and increase the yield of starch, sieves with coarser meshes are usually used, but this is again disadvantageous in that more fibers and coagulated protein get into the starch and interfere with the refining of the starch milk in the refining part of the system.

THE INVENTION

The invention is addressed to the problem of creating a new process making it possible to use centrifugal separators in the wash-out part of the system, increasing the yield, and greatly reducing the percentage of fibrous substances and coagulated proteins being brought with the starch milk into the refining part of the system, thereby also reducing the refining costs and improving the quality of the final product.

The invention sets out, on the one hand, from the idea that, through the appropriate selection of the throughput in a centrifugal separator, it is possible to separate the coarser grains of starch in relatively pure form.

It additionally sets out from the fact that the finer starch grains and the fibers may be separated more easily from one another if the weighting of the fibers by included starch is eliminated and if all particles have, insofar as possible, the same size.

It has been found that the requirements for the use of centrifugal separators in the wash-out part of a starch recovery system may be met by subjecting the portion of the mixture consisting of fibers mixed with starch grains to a homogenizing action, i.e., by making the material being treated capable of centrifugal separation.

By the homogenization the cell tissue is more finely divided and the starch is released virtually completely. In this manner the weighting of the fibers by included starch is eliminated, so that now the starch and the fibers are independent components. In addition, the homogenization substantially reduces the otherwise considerable difference in the particle size. Since the density difference between starch and fibers is relatively great, good separation may be achieved in a centrifugal separator.

The process of the invention is thus characterized by the fact that the mixed fraction which has been freed in the preliminary stage of most of the juice and consists essentially of fibers and starch is, after preliminary separation of the coarser starch grains, if desired, finely divided in a homogenizer, and the suspension containing the homogenized solids is separated in one or more wash-out centrifuges into starch milk and wash water. If a coarser grind is used, it is recommendable to subject all of the pulp to the homogenizing treatment, whereas when a finer grind is used it is more advantageous first to separate the coarser starch grains in a first wash-out centrifugal separator at a correspondingly higher throughput and then to homogenize only the mixture containing the finer starch grains and the fibers. In this manner more than 50% of all of the starch may be obtained in relatively pure form.

The separation of the starch from the fibers in a centrifugal separator always presumes the preliminary addition of washing water. Since, however, there are homogenizers for thin and thick fluid mixtures, the washing water may be added either ahead of or after the homogenizer. Consequently there are variations in the manner in which the process is conducted, depending on the grind that is used and on the homogenizer.

Thus, the invention provides a process of recovering starch from cell tissue of a root crop. The root crop, after washing, if desired, is subjected to grinding. The ground root crop is separated by centrifuging into a liquid fraction containing impurities and a solids fraction containing starch and cell tissue including cell fibers having included starch. Wash water is added to the separated solids fraction, and the resulting admixture is separated by centrifuging into starch milk and aqueous phase containing fibers in at least one centrifuging step. According to the invention, the cell fibers are homogenized to free the cell fibers of included starch, and the homogenization product is separated in one of the centrifuging steps wherein starch milk is separated, into the starch milk and aqueous phase.

EMBODIMENTS

Figure 2:
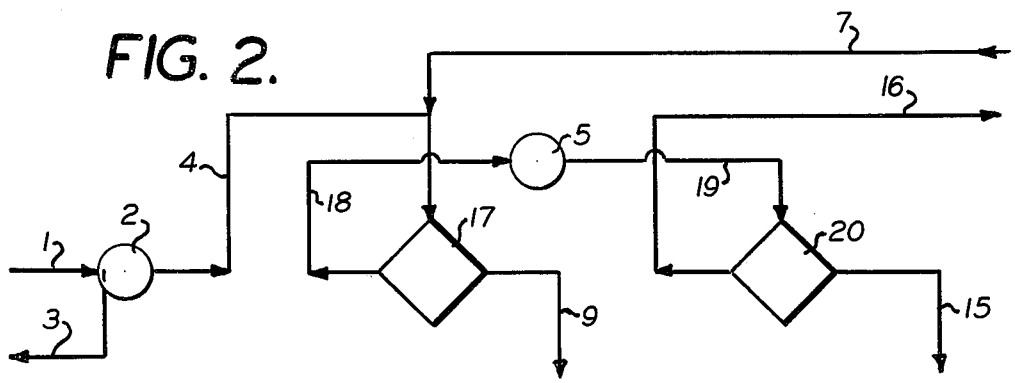
Figure 3:
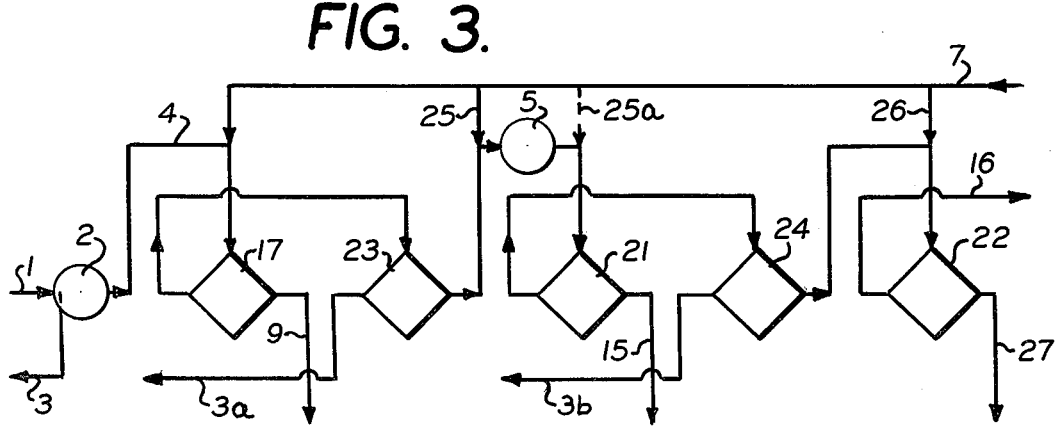

In the drawing there are shown three embodiments of the invention:

FIG. 1 shows the homogenization of the mixed fraction coming from the preliminary stage and containing all of the starch, FIG. 2 shows the preliminary separation of the coarser starch grains in a first washing centrifuge and the homogenization of the aqueous fraction leaving the centrifuges and containing the finer starch grains and the fibers, and FIG. 3 shows the process of FIG. 2 with separation, prior to the homogenization, of the water containing the dissolved proteins and the finer fibers.

With reference to FIG. 1, the pulp coming from a coarser grinder 2a is delivered through line 1 to the centrifuge 2 of the preliminary stage which separates the main part of the juice from the solids. The juice is carried away through line 3. The mixed fraction consisting essentially of starch and fibers passes through line 4 to the homogenizer 5 which accomplishes the virtually complete disintegration of the tissue cells. The addition of water required for the subsequent separation of starch and fibers in the washing centrifuge 6 is performed in this embodiment before the homogenization. The washing water is brought in through lines 7 and 8. Depending on the construction of the homogenizer, the addition of the water may also be performed after the homogenization, as indicated by the broken line 8a.

The homogenized mixed fraction is separated in the washing centrifuge 6, at an appropriately controlled throughput, into virtually pure starch milk and an aqueous phase containing the remaining starch and the fibers. The starch is fed through line 9 to the refining part of the system, which is not shown. The remaining solids are washed out again by spinning out the used washing water and replacing it with fresh washing water, and separating the starch from the other solids in a second washing centrifuge. The aqueous phase leaving the washing centrifuge 6 is delivered for this purpose through line 10 to the wash-out centrifuge 11 for the removal of the used washing water with which most of the dissolved proteins, a portion of the undissolved proteins and the finer fibers are carried out of the process through line 3a.

The concentrated mixed fraction is diluted with fresh washing water which is brought in through line 12 and the mixture is delivered through line 13 to the second wash-out centrifuge 14 which separates the remaining starch from the remaining solids. The starch milk is fed through line 15 to the refining part of the system and the aqueous phase, laden with the other solids, is carried out through line 16. If necessary, a third wash-out stage may follow the second wash-out stage.

In the embodiment shown in FIG. 2, the dewatered mixed fraction coming from a finer grinder has washing water added to it and is then fed to a washing centrifuge 17 which with an appropriate controlled throughput, separates the coarser starch grains in relatively pure form. The starch milk is again fed through line 9 to the refining part of the system, while the aqueous phase, which now contains only fine starch and the fibers, is delivered without any change of the washing water through line 18 to the homogenizer 5. The homogenized mixture passes through line 19 to the second wash-out centrifuge 20 from which the discharged starch milk is delivered through line 15 to the refining part of the system and the aqueous phase, charged with the other solids, is carried out through line 16. Here, again, the second centrifuging stage may be followed by another washing stage.

The embodiment in FIG. 3 shows basically the same process as in FIG. 2 except that the system includes three washing centrifuges 17, 21 and 22 and that, prior to the last two of these, the used washing water is removed by means of the centrifuges 23 and 24 and replaced by fresh washing water brough in through lines 25 and 25a, respectively, and 26.

The used washing water is carried out of centrifuge 23 through line 3a and out of centrifuge 24 through line 3b. From the final washing centrifuge 22 the starch milk runs through line 27 to the refining part of the installation and the washing water charged with the rest of the solids is discharged from the process through line 16.

The washing water line 7 represented in all of the embodiments may be a fresh water line. The washing water, however, may also be fed countercurrently through the sytem in a known manner.

EXAMPLE

The process shown in FIG. 1 was first carried out without homogenizer 5 and the streams of pulp-containing wash water discharging from the pipe lines 3a and 16 were combined. A sample of 100 ml taken from this phase had a solids content of 2.42%. After sieving and drying of the solids the starch content in the dry substance determined in known manner by means of chemical reagents amounted to 50.4%.

Then the process shown in FIG. 1 was carried out with homogenizer 5 the pump of which threw the pulp starch mixture against a baffle plate under a pressure of 150 atm. The stream of pulp-containing wash water discharging from the pipe lines 3a and 16 were combined here too. Due to the higher yield of starch a sample of 100 ml had a solids content of 1.74%. The starch contained in the dry substance was 30.0%.

What is claimed is:

1. Process of recovering starch from cell tissue of a root crop, which comprises:

a. grinding the root crop,
   b. separating the ground root crop into a liquid fraction containing impurities and a solids-containing fraction containing starch and cell tissue including cell fibers having included starch,
   c. adding washing water to the separated solidscontaining fraction and separating the resulting admixture by centrifuging into starch milk and aqueous phase containing fibers in at least one centrifuging step,
   d. homogenizing the cell fibers to free the cell fibers of included starch and separating the homogenization product in the centrifuging step (s) of (c) into starch milk and aqueous phase.

2. Process according to claim 1, wherein the solids-containing fraction of (b) is subjected to said homogenization, and the aqueous phase of (d) is centrifuged to remove water therefrom and produce a solids-containing fraction, wash water is added to the last-mentioned solids-containing fraction, and separating the resulting admixture by centrifuging into starch milk and an aqueous phase containing fibers.

3. Process according to claim 1, wherein water is added to the solids-containing fraction produced in (b) and the resulting admixture is separated by centrifuging into starch milk and an aqueous phase containing fibers and the fibers in the last-mentioned aqueous phase are subjected to said homogenization, and the homogenization product is separated by centrifuging into starch milk and an aqueous phase.

4. Process according to claim 1, wherein water is added to the solids-containing fraction produced in (b), and the resulting admixture is separated by centrifuging into starch milk and an aqueous phase containing fibers, and water is removed from the last-mentioned aqueous phase by centrifuging, and the fibers from which water has been removed are subjected to said homogenization, and the homogenization product is separated by centrifuging into starch milk and an aqueous phase.

5. Process according to claim 1, wherein the separation of (b) is by centrifuging.

* * * * *